Patented Aug. 30, 1949

2,480,254

UNITED STATES PATENT OFFICE 2,480,254

ALKYLATION OF PHENOLIC COMPOUNDS CATALYZED BY FRIEDEL-CRAFTS METAL HALIDES MODIFIED BY BORIC ACID

Julian M. Mavity, Hinsdale, Ill., assignor to Universal Oil Products Company, Chicago, Ill., a corporation of Delaware No Drawing. Application June 19, 1948, Serial No. 34,150

18 Claims. (Cl. 260—624)

This application is a continuation in part of my co-pending application, Serial No. 619,431, filed September 29, 1945, now Patent No. 2,467,326.

This invention relates to the catalytic interaction of a phenolic compound with a compound capable of yielding a hydrocarbon radical. It is more particularly concerned with the production of alkyl phenols by reacting a phenol containing a hydrogen atom attached to the ring with an alkylating agent in the presence of a catalyst prepared by reacting boric acid and a metal halide of the Friedel-Crafts type.

The alkylation of phenols to produce mono and polyalkylphenols is an important reaction in organic synthesis since the alkyl phenols not only possess utility as such but also because they are important intermediates in the preparation of inhibitors and the like. I have discovered that the alkylation of phenols may be accomplished with ease and efficiency if a particular type of catalyst is utilized.

In one embodiment my invention relates to a process which comprises reacting a phenolic compound containing a substitutable hydrogen atom attached to the ring with an alkylating agent at alkylating conditions in the presence of a catalyst prepared by reacting boric acid and a metal halide of the Friedel-Crafts type with the evolution of hydrogen halide.

In a more specific embodiment my invention relates to a process which comprises reacting a phenolic compound containing a substitutable hydrogen atom attached to the ring with a monoolefin at alkylating conditions in the presence of a catalyst prepared by reacting boric acid and a metal halide of the Friedel-Crafts type with the evolution of hydrogen halide.

Phenolic compounds that may be reacted with alkylating agents in accordance with the process of this invention must contain at least one substitutable nuclear hydrogen atom, i. e., a hydrogen atom that is attached to the ring and that is capable of being replaced by a hydrocarbon radical, particularly an alkyl group. Examples of such compounds are phenol; cresol; polyhydric phenols such as hydroquinone and catechol; alkoxyphenols such as guiacol, paramethoxyphenol, and paraethoxyphenol, in which the number of carbon atoms in the alkyl group is small; naphthol; and the like.

Alkylating agents capable of yielding an alkyl group under the conditions of operation employed in the process are one type of compound capable of yielding hydrocarbon radicals that are utilizable in my process. Compounds of this type include both normally gaseous and normally liquid olefins, particularly olefins containing more than two carbon atoms per molecule. Such olefins include propylene, iso and normal butylenes, iso and normal amylenes, methylcyclohexene, and the like. Other alkylating agents include cycloparaffins containing three or four carbon atoms in the ring, mercaptans, mineral acid esters such as alkyl halides, and alkoxy compounds of the class consisting of aliphatic alcohols, and esters of carboxylic acids. In general the alkylating agents that are most easily reacted in my process comprise those in which the double bond or in which the substituent, such as the chlorine atom in alkyl chlorides, are attached to a tertiary carbon atom. Other compounds capable of yielding a hydrocarbon radical include diolefins and aromatic compounds in which a nuclear hydrogen atom has been replaced by an olefinic hydrocarbon radical. Examples of such aromatic compounds are styrene, alpha methyl styrene, and the like.

I have found that catalysts useful in promoting the condensation of phenolic compounds containing a substitutable hydrogen atom attached to the ring with compounds capable of yielding hydrocarbon radicals may be made by interacting boric acid with a metal halide of the Friedel-Crafts type under such conditions that limited amounts of hydrogen halide are evolved, which amounts generally are from about 0.5 to about 2.0 molecular equivalents based upon the metal halide. It is apparent that since there are a number of Friedel-Crafts type metal halides which may be interacted, a considerable number of alternative catalysts may be made although such catalysts will not necessarily be equivalent in their action. Friedel-Crafts type metal halides which may be reacted with boric acid to form catalysts useful in the present process include aluminum chloride, aluminum bromide, zinc chloride, zirconium chloride, ferric chloride, antimony chloride, bismuth chloride, and others. Substantially anhydrous aluminum chloride is the Friedel-Crafts type catalyst usually employed in the alkylation of phenols. However, disadvantages accompany its use in some instances on account of its high degree of activity. Thus, it has a tendency to form undesirable complexes with unsaturated and phenolic compounds. However, by reacting proportioned mixtures of an aluminum halide, such as aluminum chloride, and boric acid in accordance with the present invention, catalysts of modified activities are obtained which may be utilized for promoting the alkylation of phenolic compounds as herein set forth. These catalysts do not form substantial amounts of complexes with unsaturated and aromatic hydrocarbons and, accordingly, they may be used in continuous processes over long periods of time with relatively little contamination by such complexes so that in many instances the catalyst life is considerably longer than the life of the corresponding aluminum halide in similar types of reactions. An additional advantage of these catalysts is that their solubility in the products of this reaction is considerably less than that of metal halide, such as aluminum chloride and aluminum bromide, and thus the usual step of recovering dissolved catalyst from the reaction products often can be eliminated.

The process of my invention may be carried out in batch operation by placing a quantity of the catalyst in a reactor equipped with a stirring device, adding the phenolic compound, heating or cooling to the reaction temperature, slowly adding the alkylating agent while mixing the contents of the reactor, and recovering the product. However, the preferred method of operation is of the continuous type. In one mode of continuous operation, the granular catalyst, either alone or on a carrier, may be placed in a reaction chamber and preheated mixtures of the phenolic compound and the alkylating agent passed through the catalyst bed. If desired, a quantity of the hydrogen halide corresponding to the catalyst may be charged to the reaction zone as a promoter. The products from such a treatment may be continuously fractionated to separate the unreacted substances from the desired products.

The reactions herein described usually are carried out at temperatures of from about $-20°$ to about $150°$ C. and under a pressure of from substantially atmospheric to approximately 100 atmospheres. It ordinarily is preferable to have present in the charging stock a molecular excess of the phenolic compound over the alkylating agent in order to minimize side reactions.

The following examples are given to illustrate the method of preparing the catalyst and the results obtained by the use of the present process, although the data presented are not introduced with the intention of unduly resricting the generally broad scope of the invention:

EXAMPLE I

A catalyst was prepared as follows:

20.64 grams (⅓ mol) of ball mill ground, C. P. boric acid and 133.52 grams (1.0 mol) of fresh C. P. anhydrous aluminum chloride were intimately mixed by rotating in a mill equipped with agate balls for 1.23 hours. 136.69 grams of the recovered mixture were transferred to an 850 cc. glass bomb liner and heated in a rotating steel bomb at 200° C. for 1 hour under an initial nitrogen pressure of 20 atmospheres. The nitrogen was present to prevent sublimation of the aluminum chloride before it had time to react with boric acid. The material recovered from the liner weighed 124.63 grams; 12.06 grams of the starting material were lost as hydrogen chloride. The liner contents consisted of lumps of a white solid in the bottom of the liner with a hollow cylinder of similar material resting on the lumps and a small amount of white crystalline sublimate at the top of the liner. There was a strong hydrogen chloride odor. The liner was cut just above the hollow cylinder and the hollow cylinder together with the lumps that were in the bottom of the liner were rapidly ground in a mortar and stored in a glass stoppered bottle.

EXAMPLE II

*Apparatus*—250 cc. 3 necked flask with a draw-off equipped with a stop cock in the bottom, fitted with a 19 in. reflux condenser, a 90 cc. calibrated cylindrical dropping funnel and a mercury sealed stirrer. Also, a 22 in. and a 7 in. vacuum jacketed spiral wire filled column and a 100 cc. Claisen flask.

*Procedure*—To a vigorously stirred mixture of 46.80 grams (0.497 mol) of phenol, 12.96 grams of the catalyst prepared as described in Example I, and 15.73 grams of cyclohexane at 35° C., were added dropwise over a 15 minute period a mixture consisting of 17.63 grams (0.247 mol) of isoamylenes and 7.76 grams of cyclohexane. There was a 6° C. temperature rise after only $1/7$ of the unsaturates were in, but finally the reaction temperature fell to that of the bath. The reaction mixture was stirred an additional hour at approximately 35° C., after which the temperature was raised in 5 minutes to 70° C. and kept at 70–80° C. for another hour. At this point 50 cc. of water was added to decompose the catalyst. The phenols were separated from other organic materials by solution in excess 30% NaOH and by removal of the hydrocarbon layer and were recovered by acidification of the aqueous layer with excess concentrated HCl. The crude phenols were extracted with ether; the extracts washed with water, NaHCO₃ and water and dried over Na₂SO₄. The combined ether extracts were fractionated first at atmospheric pressure and finally at reduced pressure. The analytical data are shown in the following table.

*Table I*

| Cut No. | Atmospheric Boiling Range, °C.[2] | Distillation Pressure, mm. | Gms. per Cut | Physical State | Solubility in 10% NaOH | Corrected Recovery, gms. | Remarks |
|---|---|---|---|---|---|---|---|
| 1 | 34–34.5 | Normal | | Liquid | | | |
| 2 | 34.5–39 | do | | do | | | |
| 3 | 39–85.5 | do | 38.60 | do | | | Ether and some water. |
| 4 | 85.5–100 | do | 12.34 | do | | 53.95 | |
| 5 | 100–182 | do | [1] 3.55 | 2 liquid phases | | | |
| 6 | 182–186 | do | 9.73 | Yellow liquid | | | |
| 7 | 186–190 | do | 7.95 | White solid | Yes, in cold | | |
| 8 | 190–200 | 20 | 5.80 | Yellow solid | | 27.75 | Phenol. |
| 9 | 200–211 | 20 | 3.07 | do | Yes, in cold | | |
| 10 | 211–224 | 20 | 1.38 | Yellow liquid | Yes, in hot | | |
| 11 | 224–238 | 20 | 1.83 | do | do | 9.30 | p-t-amyl phenol. |
| 12 | 238–246 | 20 | 5.05 | Yellow solid | | | |
| 13 | 246–250 | 20 | 0.97 | do | | | |
| 14 | 250–259 | 30 | 15.58 | White solid | Yes, in hot | 16.91 | |
| Bottoms | | | 3.48 | | | 3.78 | |

| | Grams |
|---|---|
| Corrected sum of all cuts+bottoms after cut #2 | 111.69 |
| Weight of flask contents after cut #2 | 111.76 |
| | 111.69 |
| Unaccounted for | 0.07 |

[1] 1.0 gm. estimated as weight of phenol.
[2] Converted from readings at indicated pressures.

The results may be summarized as follows:

Reactants charged

| | Grams |
|---|---|
| Phenol | 46.80 |
| i-$C_5H_{10}$ | 17.63 |
| | 64.43 |
| Sum of all fractions from cut #5 to bottoms inc. | 57.74 |
| Unaccounted for | 6.69 |

| | | |
|---|---|---|
| Theoretical yield on i-$C_5H_{10}$ charged | grams | 41.3 |
| Cuts #10 to #14 inclusive | do | 26.2 |
| Yield | per cent | 63.5 |

I claim as my invention:

1. A process which comprises reacting a phenolic compound containing a substitutable hydrogen atom attached to the ring with a compound capable of yielding a hydrocarbon radical at condensation conditions in the presence of a catalyst prepared by reacting boric acid and a metal halide of the Friedel-Crafts type with the evolution of hydrogen halide.

2. A process which comprises reacting a phenolic compound containing a substitutable hydrogen atom attached to the ring with an alkylating agent at alkylating conditions in the presence of a catalyst prepared by reacting boric acid and a metal halide of the Friedel-Crafts type with the evolution of hydrogen halide.

3. A process which comprises reacting a phenolic compound containing a substitutable hydrogen atom attached to the ring with an olefinic hydrocarbon at alkylating conditions in the presence of a catalyst prepared by reacting boric acid and a metal halide of the Friedel-Crafts type with the evolution of hydrogen halide.

4. A process which comprises reacting a phenolic compound containing a substitutable hydrogen atom attached to the ring with a monoolefin at alkylating conditions in the presence of a catalyst prepared by reacting boric acid and a metal halide of the Friedel-Crafts type with the evolution of hydrogen halide.

5. A process which comprises reacting a phenolic compound containing a substitutable hydrogen atom attached to the ring with a monoolefin containing more than two carbon atoms per molecule at alkylating conditions in the presence of a catalyst prepared by reacting boric acid and a metal halide of the Friedel-Crafts type with the evolution of hydrogen halide.

6. A process which comprises reacting a phenolic compound containing a substitutable hydrogen atom attached to the ring with an isoolefin at alkylating conditions in the presence of a catalyst prepared by reacting boric acid and a metal halide of the Friedel-Crafts type with the evolution of hydrogen halide.

7. A process which comprises reacting a phenolic compound containing a substitutable hydrogen atom attached to the ring with an isoamylene at alkylating conditions in the presence of a catalyst prepared by reacting boric acid and a metal halide of the Friedel-Crafts type with the evolution of hydrogen halide.

8. A process which comprises reacting a phenolic compound containing a substitutable hydrogen atom attached to the ring with a mineral acid ester at alkylating conditions in the presence of a catalyst prepared by reacting boric acid and a metal halide of the Friedel-Crafts type with the evolution of hydrogen halide.

9. A process which comprises reacting a phenolic compound containing a substitutable hydrogen atom attached to the ring with an alkyl halide at alkylating conditions in the presence of a catalyst prepared by reacting boric acid and a metal halide of the Friedel-Crafts type with the evolution of hydrogen halide.

10. A process which comprises reacting a phenolic compound containing a substitutable hydrogen atom attached to the ring with an alkyl chloride at alkylating conditions in the presence of a catalyst prepared by reacting boric acid and a metal halide of the Friedel-Crafts type with the evolution of hydrogen halide.

11. A process which comprises reacting a phenolic compound containing a substitutable hydrogen atom attached to the ring with a tertiary alkyl chloride at alkylating conditions in the presence of a catalyst prepared by reacting boric acid and a metal halide of the Friedel-Crafts type with the evolution of hydrogen halide.

12. A process which comprises reacting a phenolic compound containing a substitutable hydrogen atom attached to the ring with tertiary butyl chloride at alkylating conditions in the presence of a catalyst prepared by reacting boric acid and a metal halide of the Friedel-Crafts type with the evolution of hydrogen halide.

13. A process which comprises reacting a phenolic compound containing a substitutable hydrogen atom attached to the ring with an alkylating agent in the presence of a catalyst prepared by reacting boric acid and aluminum chloride with the evolution of hydrogen chloride.

14. A process which comprises reacting a phenolic compound containing a substitutable hydrogen atom attached to the ring with an olefinic hydrocarbon in the presence of a catalyst prepared by reacting boric acid and aluminum chloride with the evolution of hydrogen chloride.

15. A process which comprises reacting a phenolic compound containing a substitutable hydrogen atom attached to the ring with a monoolefin in the presence of a catalyst prepared by reacting boric acid and aluminum chloride with the evolution of hydrogen chloride.

16. A process which comprises reacting a phenolic compound containing a substitutable hydrogen atom attached to the ring with a monoolefin containing more than two carbon atoms per molecule in the presence of a catalyst prepared by reacting boric acid and aluminum chloride with the evolution of hydrogen chloride.

17. A process which comprises reacting a phenolic compound containing a substitutable hydrogen atom attached to the ring with an isoolefin in the presence of a catalyst prepared by reacting boric acid and aluminum chloride with the evolution of hydrogen chloride.

18. A process which comprises reacting a phenolic compound containing a substitutable hydrogen atom attached to the ring with an isoamylene in the presence of a catalyst prepared by reacting boric acid and aluminum chloride with the evolution of hydrogen chloride.

JULIAN M. MAVITY.

No references cited.